July 17, 1962 M. L. MORGAN 3,044,706
APPARATUS FOR EVALUATING ALGEBRAIC FUNCTIONS
Filed April 25, 1955 5 Sheets-Sheet 1

INVENTOR.
Merle L. Morgan
BY
Agent July 17, 1962 M. L. MORGAN 3,044,706
APPARATUS FOR EVALUATING ALGEBRAIC FUNCTIONS
Filed April 25, 1955 5 Sheets-Sheet 3

INVENTOR.
Merle L. Morgan

United States Patent Office 3,044,706
Patented July 17, 1962

3,044,706
APPARATUS FOR EVALUATING ALGEBRAIC FUNCTIONS
Merle L. Morgan, Portland, Oreg., assignor to Electro-Measurements, Inc., Portland, Oreg., a corporation of Oregon
Filed Apr. 25, 1955, Ser. No. 503,528
40 Claims. (Cl. 235—193)

This invention pertains to computers of the electric type, and relates particularly to a method and apparatus for evaluating quantitatively algebraic functions of a complex variable.

A complex quantity is commonly specified by two real quantities, namely the real and imaginary components. The real component of the logarithm of a complex quantity is the logarithm of a real quantity known as the magnitude, absolute value, or modulus of the complex quantity, and the imaginary component of the logarithm of a complex quantity is a real quantity called the argument, amplitude, phase angle, or phase. Thus, the magnitude and phase of a complex quantity may be used as an alternative pair of components by which the quantity is specified.

There are many industrial problems whose solutions require quantitative evaluation of algebraic functions of a complex variable, as well as solutions of equations involving such functions. For example, such functions or equations are frequently encountered in the solution of linear differential equations describing such systems as electric networks, feedback amplifiers, servo-mechanisms and other electrical or mechanical systems.

In general the algebraic function may be expressed as:

$$G = m_1 g(z, a_1) + m_2 g(z, a_2) + \ldots$$

wherein $G$ designates the whole of the stated function of the complex variable $z$; $g$ represents an arbitrary function of $z$ and a corresponding parameter $a$; and the $m$'s represent positive or negative real coefficients.

In the event $g(z, a_{1,2, \text{etc.}})$ represents the logarithm or a function $f(z, a_{1,2, \text{etc.}})$, wherein $f$ is another function of $z$ and $a$, it is convenient to replace $G$ by $\log F$ to present the equation in the general forms $$\log F = m_1 \log f(z, a_1) + m_2 \log f(z, a_2) + \ldots$$

or $$F = [f(z, a_1)]^{m_1} [f(z, a_2)]^{m_2} \ldots$$

The algebraic function to be evaluated in such problems as those enumerated above can be factored and expressed in either of the equivalent specific forms $$F = K z^n (z-a_1)^{m_1} (z-a_2)^{m_2} (z-a_3)^{m_3} \ldots$$

or $$F = K z^n \left(1 - \frac{z}{a_1}\right)^{m_1} \left(1 - \frac{z}{a_2}\right)^{m_2} \left(1 - \frac{z}{a_3}\right)^{m_3} \ldots$$

wherein $F$ designates the whole of the stated function of the complex variable $z$; $K$ and the $a$'s represent complex constants, and $n$ and the $m$'s represent positive or negative real constants, and the number of factors is finite.

Quantitative evaluation of such functions involves the determination of the value of the function $F$ corresponding to one or more sets of arbitrary selected values for all of the quantities on the right side of the equation. In cases where $z$ is the unknown to be determined for a specified value of $F$, the equations are solved by repeated selection of trial values of $z$ until a value is obtained which yields the proper value of $F$.

From the foregoing it will be evident that such evaluations and solutions require large numbers of numerical calculations which often become quite involved. Attempts have been made heretofore to overcome the disadvantages of numerical calculation, by means of various electro-mechanical devices. These prior devices have not been completely satisfactory, because some of them provide only for the determination of magnitude or of phase, and those which provide for both cannot accommodate the changing of the value of $z$ without the reestablishment of the values of the other parameters.

Accordingly, it is a principal object of the present invention to provide a method and apparatus by which the quantitative evaluation of algebraic functions of a complex variable and the solution of equations involving such functions are accomplished with facility and speed and without the complications and disadvantages inherent in the devices of the prior art.

Another important object of this invention is to provide a method and apparatus to evaluate in the equations set forth hereinbefore the magnitude and phase of function $F$ for arbitrary values of all of the parameters on the right side of the equation at which the function is being evaluated, and wherein the values of $z$ may be changed without disturbing the previous setting of the other parameters.

A further important object of this invention is the provision of a method and apparatus by which to evaluate in the foregoing equations the magnitude and phase of any one unknown parameter on the right side of the equation for arbitrary values of the other parameters.

A still further important object of the present invention is to provide apparatus for the foregoing purposes, which apparatus is of comparatively simplified construction for economical manufacture.

The foregoing and other objects and advantages of this invention will appear from the following detailed description, taken in connection with the accompanying drawings, in which.

In its basic concept, the present invention provides for the solving of the magnitude and phase of the unknown quantity in equations of the type set forth hereinbefore, and involves the development of individual measurable physical quantities proportional to and representing the real and imaginary components of a term representing the logarithm of each factor without its exponent, the multiplication of each such quantity by an arbitrary coefficient representing the exponent on the factor, the combination of the resulting quantities representing similar components in proper relation according to the signs of the exponents, to yield a pair of net quantities representing the logarithmic components of the whole function, and the measurement of each net quantity.

Figure 1:
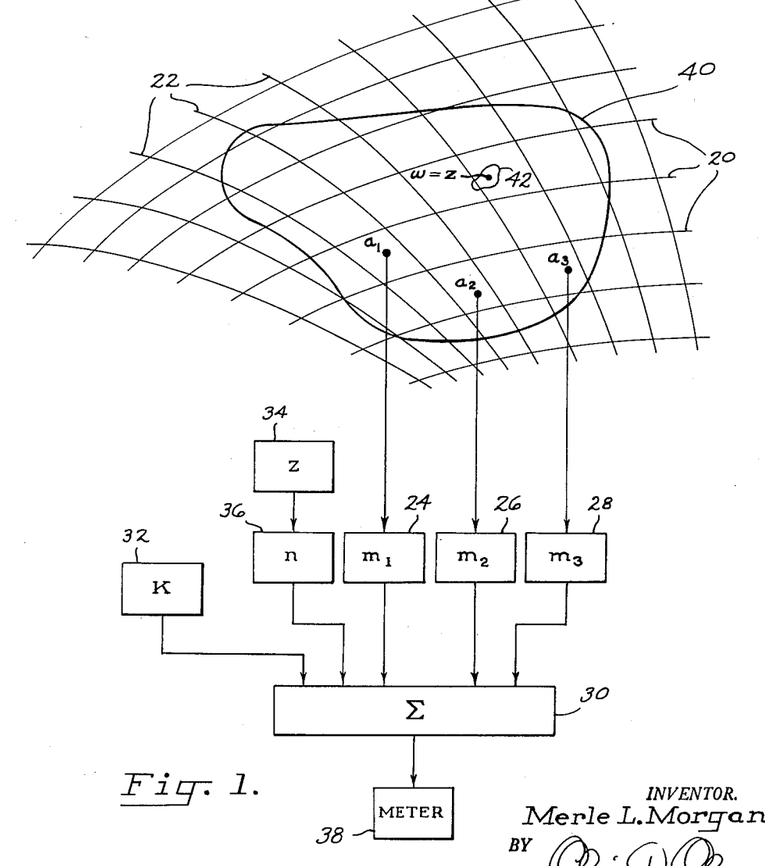
FIGURE 1 is a schematic diagram in block form, illustrating the principle of the present invention.

The basic concept of the present invention is illustrated in FIGURE 1, wherein is shown a coordinate system in which the coordinates are the real and imaginary components of a function of a complex quantity, herein called $w$. This coordinate system is represented by the grid of lines 20 and 22. It is to be understood that although the coordinate system is contained on a plane surface in FIGURE 1, it may be contained alternatively on the surface of a cylinder or other shape.

For purposes of explanation the detailed description which follows refers to the specific, rather than to the general, forms of equations set forth hereinbefore. In the coordinate system there is established a distribution of a measurable physical quantity, in which distribution the value of the physical quantity at a point represented by each value of $w$ is proportional either to the real or to the imaginary component of the logarithm of $(z-w)$ or $$\left(1-\frac{z}{w}\right)$$

wherein $z$ is an arbitrary complex parameter. Accordingly, at any particular point $w=a$, the measurable quantity is proportional to the real or the imaginary component of the logarithm of $(z-a)$ or $$\left(1-\frac{z}{a}\right)$$

By applying this quantity to a multiplying device representing a coefficient $m$, the output of the multiplying device will be a measurable quantity which is proportional to the real or the imaginary component of the logarithm of $(z-a)^m$ or $$\left(1-\frac{z}{a}\right)^m$$

Thus, by applying the measurable quantity at each of several points $w=a_1, a_2, a_3$, etc. to corresponding multiplying devices 24, 26, 28, respectively, and combining the output quantities in combining device 30, a net output quantity will be obtained which is proportional to the real or the imaginary component of the logarithm of $$(z-a_1)^{m_1} (z-a_2)^{m_2} (z-a_3)^{m_3} \ldots$$

or $$\left(1-\frac{z}{a_1}\right)^{m_1}\left(1-\frac{z}{a_2}\right)^{m_2}\left(1-\frac{z}{a_3}\right)^{m_3} \ldots$$

Auxiliary measurable quantities representing the corresponding component of $K$ and of $z^n$ may be provided in similar manner from a K factor source 32, a z factor source 34 and the multiplier 36 for its coefficient $n$, and supplied to the combining device. The output from the combining device may be indicated by means of an appropriate measuring device 38 which may be calibrated directly in terms of the magnitude or phase of the function.

The physical quantity of the distribution may, for example, be a voltage or, alternatively, it may be a third dimension such as distance or height. In this latter case, the distribution may take the form of a relief map.

The output quantities from the multiplying devices need not be of the same character as the input quantities. For example, if the input quantity is voltage, the output quantity may be voltage, current, magnetic flux, force, etc. As an illustration, an input voltage may be applied to a voltage divider or a transformer, to yield an output voltage proportional to the product of the input voltage and the ratio of the divider or transformer. Alternatively, the input voltage may be applied to a resistor to yield an output current proportional to the product of the input voltage and the conductance of the resistor. If the input voltage is alternating, it may be applied to a capacitor or other admittance.

In an analogous manner, if the input to the multiplying device is distance or height, the multiplying device may simply be a multiplying linkage, or it may be a transducer yielding such output quantities as force, voltage, etc.

Since in practice the distribution must be finite and practical in size, the region in which the distribution is established is limited, as indicated by the outer boundary 40 in FIGURE 1. At the value $w=z$, the real component of the logarithm of $(z-w)$ or $$\left(1-\frac{z}{w}\right)$$

becomes infinite, and the imaginary component becomes indeterminate. Since the physical quantity must be finite, it is apparent that the point $w=z$ cannot be included in the distribution, and therefore a small region containing the point $w=z$ and defined by the inner boundary 42, is excluded from the distribution.

Since the concept of the present invention may be embodied in any one of several forms of apparatus, it will now be described in detail with reference to a preferred construction. In this construction the quantity in the distribution is voltage, the multiplying device is an admittance, and the output quantity is therefore current.

In the embodiment illustrated in FIGURES 2–17 of the drawings, the present invention employs a two-dimensional coordinate system in which the coordinates are the components of the logarithm of a complex quantity $w$, and in which the parameter $z$ in the aforementioned equation is an arbitrary point.

For the evaluation of the magnitude of functions, a voltage distribution is set up in this coordinate system such that the voltage at every point in the distribution is proportional to the real component of the logarithm of $(z-w)$ or $$\left(1-\frac{z}{w}\right)$$

Therefore, at any arbitrary point $w=a$ in the distribution the voltage is proportional to the real component of the logarithm of $(z-a)$ or $$\left(1-\frac{z}{a}\right)$$

By applying this voltage to an admittance having a value proportional to the magnitude of an arbitrary real quantity $m$, the resulting current will be proportional to the real component of the logarithm of the factor raised to a positive exponent which is the magnitude of the quantity $m$. Thus, when the voltages at several points $a_1, a_2$, etc. are applied to admittances having values proportional to the magnitudes of corresponding quantities $m_1, m_2$, etc. and the resulting currents combined, in polarity corresponding to the sign of each of the quantities $m_1, m_2$, etc., the net current will be proportional to the real component of the logarithm of $$(z-a_1)^{m_1}(z-a_2)^{m_2}(z-a_3)^{m_3} \ldots$$

or $$\left(1-\frac{z}{a_1}\right)^{m_1}\left(1-\frac{z}{a_2}\right)^{m_2}\left(1-\frac{z}{a_3}\right)^{m_3} \ldots$$

For functions containing the factor $z^n$, an auxiliary voltage is provided which is proportional to the real component of the logarithm of the parameter $z$ when the corresponding point $z$ in the coordinate system is set to establish selected values of $z$. By applying this volage to an admittance proportional to the magnitude of an arbitrary real quantity $n$ and combining the resulting current with the net current mentioned above, in polarity corresponding to the sign of $n$, the net current then will be proportional to the real component of the logarithm of $$z^n(z-a_1)^{m_1}(z-a_2)^{m_2}(z-a_3)^{m_3}\ldots$$

or $$z^n\left(1-\frac{z}{a_1}\right)^{m_1}\left(1-\frac{z}{a_2}\right)^{m_2}\left(1-\frac{z}{a_3}\right)^{m_3}\ldots$$

By providing a manually adjustable current proportional to the real compent of the logarithm of an arbitrary constant $K$, and combining this current with the net current last mentioned above, the final net current then will be proportional to the real component of the logarithm of $$Kz^n(z-a_1)^{m_1}(z-a_2)^{m_2}(z-a_3)^{m_3}\ldots$$

or $$Kz^n\left(1-\frac{z}{a_1}\right)^{m_1}\left(1-\frac{z}{a_2}\right)^{m_2}\left(1-\frac{z}{a_3}\right)^{m_3}\ldots$$

These expressions are seen to be the alternate forms of the function $F$ in the equations first set forth hereinbefore. Thus, the net current is proportional to the real component of the logarithm of $F$, which is the logarithm of the magnitude of $F$, and can be measured on a meter which may be calibrated in terms of the magnitude of $F$.

For the evaluation of the phase of functions, a second voltage distribution is set up in the same coordinate system, in which the voltage at every point in the distribution is proportional to the imaginary component of the logarithm of $(z-w)$ or $$\left(1-\frac{z}{w}\right)$$

Accordingly, in manner similar to the foregoing procedure for the evaluation of magnitudes, the voltages at the same points $a_1$, $a_2$, etc, and an auxiliary voltage proportional to the imaginary component of the logarithm of $z$, may be applied to the same admittances and combined in the same measuring circuit with a current proportional to the imaginary component of the logarithm of $K$, to yield a net current which is proportional to the imaginary component of the logarithm of $F$. This is the phase of $F$, and may be measured on a meter which may be calibrated in terms of the phase of $F$.

The contours of the components of the logarithm of $(z-w)$ or $$\left(1-\frac{z}{w}\right)$$

are infinite in extent, but the corresponding voltage distributions may be set upon finite sheets of resistive material, the conducting and insulating boundaries of which must conform to segments of contours of voltage and current, respectively. The contours of voltage (equipotential lines) and current (streamlines) on a sheet of uniformly resistive material obey the same geometric laws as the contours of the components of analytic functions such as those set forth hereinbefore. Therefore, the application at the conducting boundaries of voltages proportional to the corresponding components of the logarithm of $(z-w)$ or $$\left(1-\frac{z}{w}\right)$$

along the contour of the boundary produces over the entire sheet the voltage distribution representing the same component of the same quantity.

The voltage distribution for functions containing factors in the form $(z-a)$ will now be considered.

The voltage distribution set up on a finite sheet will be a portion of the voltage distribution on a theoretical infinite sheet containing all values of $w$. If a current were to flow in this infinite sheet from $w=$infinity to an arbitrary point $w=z$, the voltage at any point $w=a$ relative to the voltage at any reference point $w=r$ would be proportional to the real component of the logarithm of $$\frac{z-a}{z-r}$$

Accordingly, this relation obtains on the finite sheet for all points $w=a$, and $w=r$ contained within its area.

The conducting boundaries of this finite sheet must conform to contours of the real component of the logarithm of $(z-w)$, and insulating boundaries must conform to contours of the imaginary components of the same quantity. Since the real component of the logarithm of a quantity is the logarithm of its magnitude, this finite sheet will hereinafter be referred to as the magnitude sheet.

By selecting the reference point $r$ such that the value of the magnitude of the complex quantity $r$ is much less than the magnitude of the parameter $z$, the voltage at $a$ relative to that at $r$ is substantially proportional to the real component of the logarithm of $$\frac{z-a}{z}$$

By establishing the voltage at the reference point $r$ relative to an ultimate reference point for the current combining circuit, referred to hereinbefore, to be proportional to the real component of the logarithm of $z$, the voltage at point $a$ relative to this ultimate reference point will be proportional to the real component of the logarithm of $(z-a)$.

Various methods are available for establishing the voltage at the reference point $r$ relative to the ultimate reference point. One method involves the use of a voltage at another point $w=s$, located in such manner that the value of the magnitude of $s$ is much greater than the magniture of $z$. The voltage at $s$ relative to $r$ therefore is proportional to the real component of the logarithm of $$\frac{z-s}{z}$$

Since $s$ is much larger than $z$, this voltage is substantially proportional to the real component of the logarithm of $$\left(-\frac{s}{z}\right)$$

Accordingly, by establishing the voltage at $s$ relative to the ultimate reference point proportional to the real component of the logarithm of $(-s)$, the voltage at $r$ relative to the ultimate reference point is proportional to the real component of the logarithm of $z$.

Having established the foregoing conditions, it is now required only that the voltages at the points $w=a_1$, $a_2$, etc., can be connected to the admittances representing the corresponding values $m_1$, $m_2$, etc., and that the voltage at point $w=r$ be connected to the admittance representing the exponent $n$ in the equation originally set forth. It is understood that the opposite end of each admittance is to be held at the voltage of the ultimate reference point.

By combining the resulting currents, together with the current representing the real component of the logarithm of $K$, the net current, as previously explained, will represent the real component of the logarithm of $F$. This is the logarithm of the magnitude of $F$.

For the evaluation of the imaginary component of the logarithm of $F$, it is necessary to provide a second sheet of uniformly resistive material on which the voltage at any point $w=a$ relative to the voltage at any reference point $w=r$ is proportional to the imaginary component of the logarithm of $$\frac{z-a}{z-r}$$

Since the imaginary component of the logarithm of a quantity is the phase of the quantity, this second sheet will hereinafter be referred to as the phase sheet.

The conducting boundaries of the phase sheet must conform to contours of the imaginary component of the logarithm of $(z-w)$, and its insulating boundaries must conform to contours of the real component.

By selecting the reference point $r$ on the phase sheet in such manner that the value of the magnitude of $r$ is much less than the magnitude of the parameter $z$, the voltage at $a$ relative to that at $r$ is substantially proportional to the imaginary component of the logarithm of $$\frac{z-a}{z}$$

Thus, by establishing the voltage at the reference point $r$ relative to the ultimate reference point to be proportional to the imaginary component of the logarithm of $z$, the voltage at point $a$ relative to this ultimate reference point is proportional to the imaginary component of the logarithm of $(z-a)$.

The described method for establishing the voltage at point $r$ involves for the phase sheet the use of a voltage at a point $w=s$ so located that the value of the magnitude of $s$ is much greater than the magnitude of $z$, and the phase of $s$ is Pi radians, or 180°. Accordingly, the voltage at $s$ relative to $r$ is substantially proportional to the imaginary component of the logarithm of $$\left(-\frac{s}{z}\right)$$

and since the phase of $s$ has been set equal to 180°, this reduces to the imaginary component of the logarithm of $$\left(\frac{1}{z}\right)$$

Therefore, the voltage at $r$ relative to $s$ is proportional to the imaginary component of the logarithm of $z$.

By connecting point $s$ on the phase sheet directly to the ultimate reference point, the voltage at $r$ relative to the ultimate reference point is proportional to the imaginary component of the logarithm of $z$. By connecting the voltages at points $w=a_1$, $a_2$, etc., and point $w=r$ to their respective admittances, and combining the resulting currents as before, the net current will represent the imaginary component of the logarithm of F, which is the phase of F.

For functions containing factors in the form $$\left(1-\frac{z}{a}\right)$$

it is required that the current in the theoretical infinite magnitude sheet flow from $w=$zero to the point $w=z$, rather than from $w=$infinity. In this case the voltage at any point $w=a$ relative to the voltage at any reference point $w=r$ will be proportional to the real component of the logarithm of $$\frac{\left(1-\frac{z}{a}\right)}{\left(1-\frac{z}{r}\right)}$$

The conducting boundaries of the corresponding finite magnitude sheet must conform to contours of the real component of the logarithm of $$\left(1-\frac{z}{w}\right)$$

and the insulating boundaries must conform to contours of the imaginary component of the same quantity.

By selecting the reference point $r$ in such manner that the value of the magnitude of the complex quantity $r$ is much greater than the magnitude of the parameter $z$, the voltage at $a$ relative to that at $r$ is substantially proportional to the real component of the logarithm of $$\left(1-\frac{z}{a}\right)$$

Accordingly, reference point $r$ on the sheet may be connected directly to the ultimate reference point on the current combining circuit.

In order to accommodate the magnitude of the factor $z^n$ in the function F, it is necessary to provide a voltage proportional to the real component of the logarithm of $z$. One method of providing this voltage involves the use of a voltage at a point $s$, located in such manner that the magnitude of the value of $s$ is much less than the magnitude of $z$. Therefore, the voltage at $s$ relative to $r$, and hence relative to the ultimate reference point, is proportional to the real component of the logarithm of $$\left(1-\frac{z}{s}\right)$$

Since $s$ is much smaller than $z$, this voltage is substantially proportional to the real component of the logarithm of $$\left(-\frac{z}{s}\right)$$

By subtracting from this voltage a voltage proportional to the real component of the logarithm of $$\left(-\frac{1}{s}\right)$$

the resulting voltage is proportional to the real component of the logarithm of $z$. By applying this voltage and the voltages at the points $w=a_1$, $a_2$, etc., to the respective admittances representing the exponents $n$ and $m_1$, $m_2$, etc., and combining the resulting currents with the current representing the real component of the logarithm of K, as previously explained, the resulting net current represents the real component of the logarithm of F. This is the logarithm of the magnitude of F.

For the evaluation of the imaginary component of the logarithm of F in functions of this second form, the phase sheet is provided with a voltage distribution in which the voltage at any point $w=a$ relative to the voltage at any reference point $w=r$ is proportional to the imaginary component of the logarithm of $$\frac{\left(1-\frac{z}{a}\right)}{\left(1-\frac{z}{r}\right)}$$

The conducting boundaries of the phase sheet must conform to contours of the imaginary component of the logarithm of $$\left(1-\frac{z}{w}\right)$$

and the insulating boundaries must conform to the contours of the real component of the same quantity.

By selecting the reference point $r$ on the phase sheet in such manner that the value of the magnitude of $r$ is much greater than the magnitude of the parameter $z$, the voltage at $a$ relative to that at $r$ is substantially proportional to the imaginary component of the logarithm of $$\left(1-\frac{z}{a}\right)$$

Accordingly, reference point $r$ may be connected directly to the ultimate reference point of the current combining circuit.

To accommodate the phase of the factor $z^n$ in the function F, a voltage is provided which is proportional to the imaginary component of the logarithm of $z$. This voltage is available at a point $s$ located in such manner that the value of the magnitude of $s$ is much less than the magnitude of $z$, and the phase of $s$ is Pi radians, or 180°. By applying this voltage and the voltages at the point $w=a_1$, $a_2$, etc., to the respective admittances representing the exponents $n$ and $m_1$, $m_2$, etc. and combining the resulting currents with the current representing the imaginary component of the logarithm of K, the resulting net current will represent the imaginary component of the logarithm of F. This is the phase of F.

In apparatus for performing the method of the present invention, it is desirable that the voltage distributions previously described be set up on sheets of uniformly resistive material having fixed conducting and insulating boundaries and having applied to the conducting boundaries voltages which remain fixed for all values of the parameter $z$. Accordingly, the voltage distributions will remain fixed in size and shape relative to the sheets, for all values of $z$. Since the contours of various values of voltage correspond to the contours of various values of the real or imaginary components of the logarithm of $(z-w)$ or $$\left(1-\frac{z}{w}\right)$$

the contours of said components must also remain fixed in position relative to one another, for all values of $z$.

It will be apparent from the foregoing that the contours of said components must also remain fixed in position relative to point $z$, and therefore $z$ is represented by a point fixed in relation to each resistive sheet. Accordingly, the value of the parameter $z$ in the equations will correspond to the position at which this point is placed in the coordinate system. Changes in the value of $z$ therefore will represent a relative movement between the resistive sheets and the coordinate system.

Various coordinate systems may be employed. For example, it will be apparent that the simple $w$ coordinate system will accommodate the foregoing requirements for factors of the form $(z-w)$, since in this coordinate system any given value of $(z-w)$ represents the same distance and direction for any value of $z$, and therefore a contour of a component of a given value of $(z-w)$ will remain fixed in size and shape for any value of $z$. Similarly, the $$\frac{1}{w}$$

coordinate system will accommodate the foregoing requirements for factors in the form $$\left(1-\frac{z}{w}\right)$$

The use of a log $w$ coordinate system has been found to accommodate all of the foregoing requirements for both forms of the function. It is to be understood that the function may be expressed either in the form containing factors $(z-w)$, or in the form containing factors $$\left(1-\frac{z}{w}\right)$$

but the two types of factors cannot be combined in the same function.

The use of the log $w$ coordinate system offers additional advantages. It enables the use of the same magnitude and phase sheets for establishing the voltage distributions required for both forms of the function, as will be apparent hereinafter. Sheets of limited size will accommodate a wide range of values of complex quantites in logarithmic coordinates, and a given tolerance in the placement of a point any where in this coordinate system corresponds to the same relative error in the complex quantity represented by the point.

Figure 17:
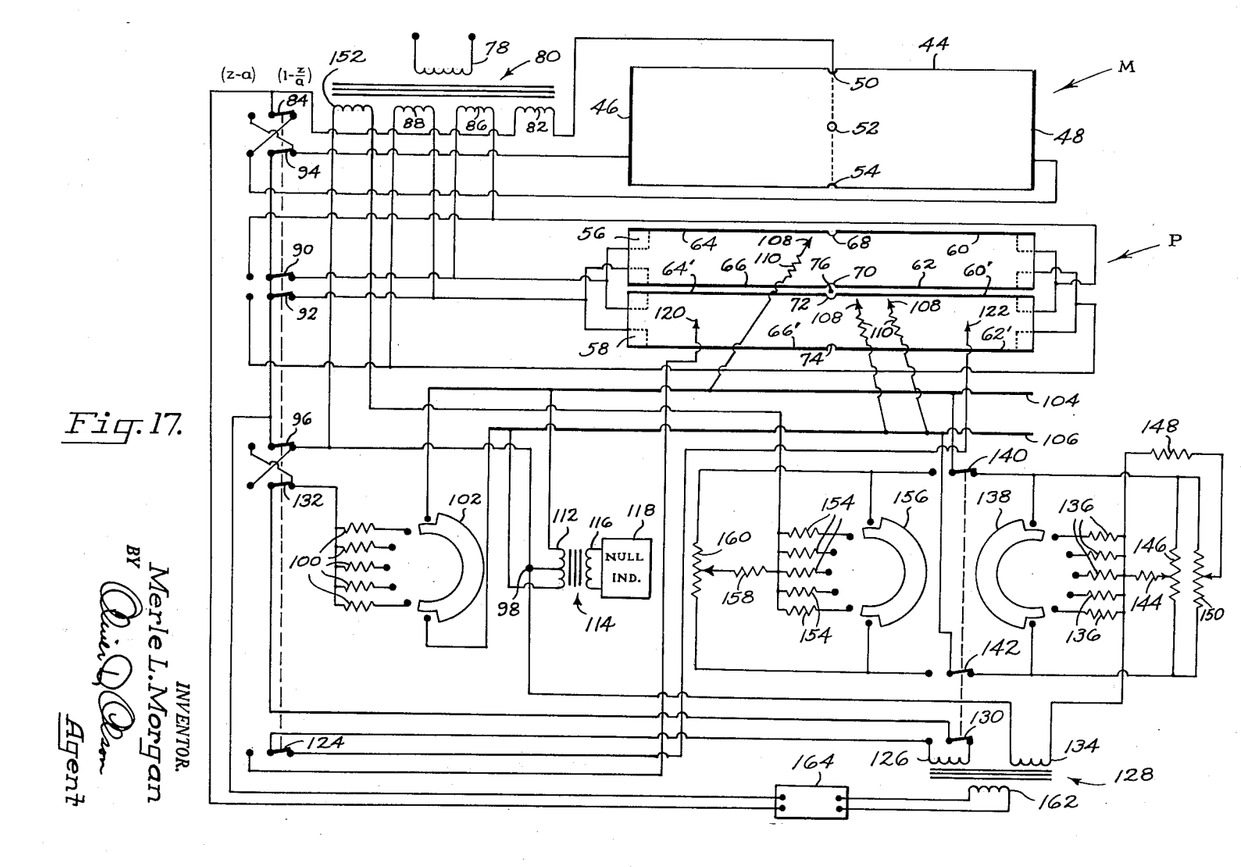
FIGURE 17 is a schematic diagram of an electrical circuit for use in the computer of the present invention.

Referring now particularly to FIGURE 17 to the drawings, there is shown the magnitude sheet assembly M of resistance material and a corresponding phase sheet assembly P. These sheets may be constructed from any convenient type of material which provides uniform resistance throughout its length and width. Metal foil, such as Phosphor bronze, Nichrome or stainless steel, as well as electrically conducting glass, synthetic plastic and others, may be used. A form of uniform resistance paper sold under the trade name Teledeltos, has been found to be quite suitable.

The magnitude sheet assembly M and the phase sheet assembly P are placed arbitrarily in FIGURE 17, merely for convenience in the arrangement of the circuit diagram. As shown, the coordinate system for each sheet is oriented so that the magnitude of $w$ increases toward the left and the phase of $w$ increases toward the bottom of the drawing. The total width of each sheet corresponds to a phase difference of 4 Pi radians, or 720°.

In the embodiment illustrated, the magnitude sheet 44 is in the form of an elongated rectangle, with the opposite ends provided with strips of electrically conducting material, providing the conducting boundaries 46 and 48. Conducting boundaries 50, 52, 54 are also provided. Boundary 52 is circular in form and boundaries 50 and 54 are semicircles. The radii of these boundaries are equal and are sufficiently small that they conform substantially to equipotential lines in the voltage distribution for either form of the function. The center of each of these boundaries represents the point $z$, and these centers are spaced apart a distance corresponding to 2 Pi radians, or 360°, in the phase coordinate, since in logarithmic coordinates any complex quantity is repeated at intervals of 360° in the phase direction.

The conducting boundaries 46 and 48 are removed sufficiently from the small circular boundaries 50, 52, 54 that they correspond substantially to equipotential lines in the voltage distribution for either form of the function. Horizontal lines passing either through the centers of the small circular boundaries, or midway between pairs of them, are streamlines in the magnitude sheet voltage distribution for both forms of the function. Accordingly, the edges of the sheet intercepted by the boundaries 50 and 54 are proper insulating boundaries.

The phase sheet assembly P is shown in FIGURE 17 to comprise two elongated strips 56 and 58 which are separated electrically and provided along their longitudinal edges with strips of electrically conducting material providing the conducting boundaries 60, 60', 62, 62', 64, 64', and 66, 66'. The boundaries 60, 64 are separated by the semicircular insulating boundary 68. Similarly, the boundaries 62, 66 are separated by the semicircular insulating boundary 70, boundaries 60', 64' are separated by insulating boundary 72, and boundaries 62', 66' are separated by insulating boundary 74. The semicircular boundaries 70 and 72 are concentric about center point 76.

The semicircular insulating boundaries are small in radius, so that they conform substantially to streamlines in the voltage distributions of both forms of the function. The centers of these insulating boundaries represent the point $z$ and are spaced apart a distance corresponding to 360° in phase. Accordingly, in their respective coordinate systems, the center of insulating boundary 68 corresponds to the center of conducting boundary 50, the center 76 of insulating boundaries 70 and 72 corresponds to the center of conducting boundary 52, and the center of insulating boundary 74 corresponds to the center of conducting boundary 54.

The longitudinal ends of the strips 56 and 58 of the phase assembly are removed sufficiently from the small semicircular boundaries 50—54 that they correspond substantially to streamlines in the voltage distributions for both forms of the function.

Horizontal lines passing either through the centers of the small semicircular insulating boundaries, or midway between pairs of them, are equipotential lines in the phase sheet voltage distribution for both forms of the function. The conducting boundaries 60, 64 and 62', 66' are proper conducting boundaries, since they lie on lines passing through the centers of the insulating boundaries 68 and 74, respectively.

The inner conducting boundaries separated by the insulating boundaries 70 and 72 must be separated electrically, and yet they should lie on the equipotential line passing through the common center 76. This requirement may be approximated by employing an insulating barrier of minimum thickness, or it may be satisfied precisely by the construction described in detail hereinafter.

In the circuit diagram shown in FIGURE 17 of the drawings, the source of electric potential for the computer is provided through the primary winding 78 of transformer 80. One secondary winding 82 of this transformer is connected at one end to the conducting boundaries 50, 52, 54 on the magnitude sheet 44. These boundaries are connected together electrically, as indicated by the dotted lines. The opposite end of secondary winding 82 is connected through switch 84 alternatively to the conducting boundaries 46 and 48 of the magnitude sheet.

The conducting boundaries 60 and 60' of the two sections of the phase sheet assembly are connected together electrically, as are the conducting boundaries 62, 62'; 64, 64'; and 66, 66'. The boundaries 60 and 60' are connected to one end of secondary winding 86 and boundaries 64, 64' are connected to the other end of said secondary winding. Similarly, conducting boundaries 62, 62' and 66, 66' are connected to the opposite ends of secondary winding 88.

The conducting boundaries of the phase sheet assembly are also connected alternatively to switches 90 and 92 in such manner that all of the conducting boundaries to the left or right of the central insulating boundaries may be connected together. Thus, as illustrated in FIGURE 17 of the drawings, switches 90 and 92 are positioned in such manner that the conducting boundaries to the left of the insulating boundaries are all connected together. In addition, the left hand conducting boundary 46 of the magnitude sheet is connected through switch 94 to the left hand conducting boundaries of the phase sheet assembly.

It will be understood that when the switches 90, 92 and 94 are moved to their alternate positions, the conducting boundaries to the right of the central insulating boundaries, and the conducting boundary 48 of the magnitude sheet, will be connected together. In each case, the boundaries thus connected together are used as the reference point $r$ on the sheet, previously mentioned, and the voltages from the secondary windings 82, 86, 88 are applied between these boundaries and the remaining conducting boundaries to provide the required voltage distributions on the magnitude and phase sheets. The switches are shown in FIGURE 17 in the position for functions containing factors in the form $$\left(1-\frac{z}{a}\right)$$

Reference point $r$ is also connected to switch 96. For factors in the form $$\left(1-\frac{z}{a}\right)$$

this switch connects reference point $r$ to the ultimate reference point 98. For factors in the form $(z-a)$, the voltage at reference point $r$ relative to the ultimate reference point represents the component of the logarithm of $z$, and the reference point $r$ is connected through switch 96 to the common end of the equal conductances 100. One or more of these conductances may be connected in parallel by means of switch 102 to either of the bus bars 104 or 106, and the number of conductances so connected represents the magnitude of the exponent $n$ on the factor $z$ in the function. Switch 102 may be moved in either direction from the central position shown, to connect the conductances to either of the bus bars for establishing the proper sign for the exponent $n$.

Having thus established the voltage distributions on the sheets, a plurality of movable contact elements 108 are provided for making contact with the sheets at the points $a_1$, $a_2$, etc., of the function F. These contact elements are shown in FIGURE 17 applied to the phase sheet. It will be understood that they will be transferred to the magnitude sheet for evaluation of the magnitude of a function.

The movable contact elements are connected through conductance elements 110 representing the magnitudes of the associated exponents $m_1$, $m_2$, etc., to one or the other of the bus bars 104 or 106. Bus bar 104 is used for those factors in which the exponent $m$ is positive, and bus bar 106 is used for those factors in which the exponent is negative.

The bus bars are connected to the opposite ends of the primary winding 112 of current combining transformer 114. The center tap connection 98 of this primary winding is the ultimate reference point referred to hereinbefore, at which all of the currents are combined. The secondary winding 116 of transformer 114 is connected to a null indicating meter 118 for purposes explained more fully hereinafter.

Permanent contact elements 120 and 122, fixed with respect to the coordinate system, are provided for contact with the magnitude and phase sheets at the point $s$ for each of the two forms of the function. Contact element 120 is associated with the form $(z-a)$, while contact element 122 is associated with the form $$\left(1-\frac{z}{a}\right)$$

Either of these elements may be selected by means of switch 124 which is connected to one end of the secondary winding 126 of transformer 128.

The voltage on secondary winding 126 represents the real component of the logarithm of $s$, or of $$\frac{1}{s}$$

depending upon the form of the function. The opposite ends of this secondary winding are connected selectively through switch 130 to switch 132. When switch 130 is in the magnitude position shown, the voltage of winding 126 is connected between switch 132 and the permanent contact 120 or 122, selected by switch 124, while in the phase position switch 130 connects the switch 132 directly to the contact 120 or 122. For the form $$\left(1-\frac{z}{a}\right)$$

the voltage at switch 132 represents the component of the logarithm of $z$, and this switch connects this voltage to the common ends of conductances 100. For the form $(z-a)$, switch 132 connects directly to the ultimate reference point 98.

Measurement of the net current representing either component of the logarithm of the right hand side of the equations originally set forth, and resulting from the combination of the currents representing the various factors, may be accomplished by various means. It is preferred to use a measuring system of the null balance type, in which the balancing current is derived from the voltage applied to the sheet. In this manner, errors due to changes in the applied voltage are eliminated.

Although the null balance indicator may be polarity sensitive for convenience in indicating the direction of unbalance, it will be apparent that a simple magnitude indicator, such as a tuning eye, may be employed. In the use of a null balance type of measuring system, a calibrated current is utilized to represent a trial value of the function F on the left hand side of the equation, and when this current balances the net current representing the right hand side, the condition of equality is indicated by the null indicator 118.

For the measurement of magnitudes of F, the calibrated current is derived from the voltage provided by the secondary winding 134 of transformer 128. One end of this secondary winding is connected to the ultimate-reference point 98, and the opposite end is connected to the common ends of a plurality of equal conductances 136. One or more of these conductances may be connected in parallel by means of switch 138, to either of the bus bars 104 or 106, through switches 140 and 142, respectively, when the latter are in the magnitude position shown.

The common ends of the conductances 136 are also connected through conductance 144 through the adjustable contact on potentiometer resistance 146 and through conductance 148 to the adjustable contact on potentiometer resistance 150. The opposite ends of the potentiometer resistances 146 and 150 are connected through the switches 140 and 142 to the bus bars 104 and 106, respectively, when the switches are in the magnitude position shown.

Currents flow from the ends of potentiometer resistance 150 through the bus bars to the opposite ends of the primary winding 112 of transformer 114, and the difference between these currents represents the real component of the logarithm of K. Similarly, currents from the opposite ends of potentiometer resistance 146 and from switch 138 flow to the opposite ends of primary winding 112 to provide a difference which represents the real component of the logarithm of F.

For measurement of the phase of F, the calibrated current is derived from the voltage provided by the secondary winding 152 of the main transformer 80. One end of this winding is connected to the ultimate reference point 98 and the opposite end is connected to the common ends of a plurality of equal conductances 154. One or more of these conductances may be connected in parallel by means of switch 156 to either of the bus bars through switches 140 and 142, respectively, when the latter are in the phase position, i.e. the alternate position from that shown in FIGURE 17. The common ends of the conductances are also connected through conductance 158 to the adjustable contact on potentiometer resistance 160. The opposite ends of this potentiometer resistance are connected through switches 140 and 142 to the bus bars 104 and 106, respectively, when these switches are in the phase position. Currents from the opposite ends of potentiometer resistance 160 and from switch 156 flow to the opposite ends of primary winding 112 to provide a difference current which presents the imaginary component of the logarithm of F.

Another potentiometer may be provided in the manner of potentiometer 150 to provide for the introduction of the imaginary component of the logarithm of K. However, it is omitted herein for simplicity, since K generally is a real quantity in most functions encountered in actual practice.

The secondary windings 126 and 134 of transformer 128 are supplied from the primary winding 162, the opposite ends of which are connected to the output terminals of isolation amplifier 164, such as a cathode follower. The input terminals of this amplifier are connected through switches 84 and 94 to the conducting boundaries 46 and 48 of the magnitude sheet 44. It will be understood that if the current drawn by primary winding 162 is sufficiently small that the voltage distribution on the magnitude sheet will not be significantly changed by the omission of isolation amplifier 164, the primary winding may be connected directly to switches 84 and 94.

A constant of proportionality relating voltages to distances in the coordinate system is implicit in the voltage distributions. However, localized heating produced by the concentration of current in the vicinity of boundaries 50, 52 and 54 may result in variations in resistance in these areas. Such a condition may cause distortion of the voltage distribution and a variation in the constant of proportionality in these areas. However, the voltage distribution over the remaining area of the sheet will not be significantly affected, and it is the constant of proportionality in this area which is best applied to the voltages of windings 126 and 134. It is for this reason that the voltage applied to the primary winding 162 is derived from the voltage difference between the conducting boundaries 46 and 48, both of which are outside the area of distorted voltage distribution. In the event that the distortion is negligible, the secondary windings 126 and 134 may be provided as additional windings on the main transformer 80.

Figure 2:
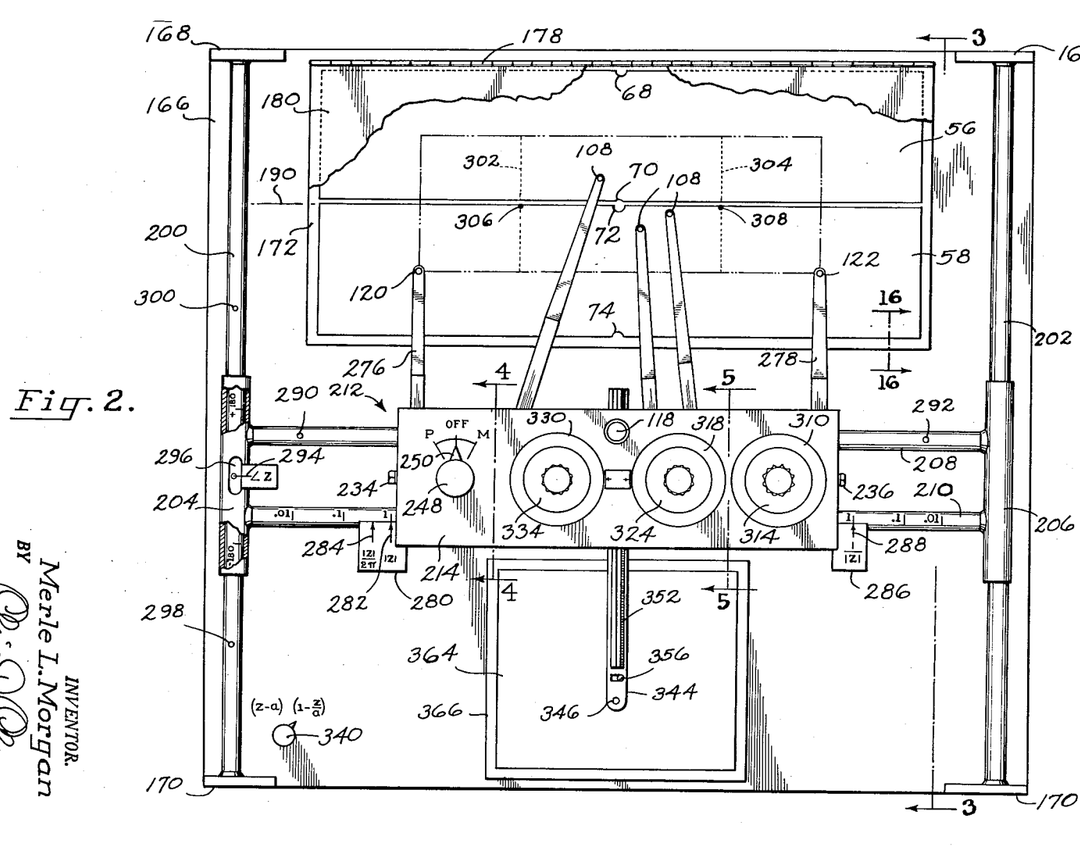
FIGURE 2 is a plan view showing the general construction of a computer embodying the features of the present invention, portions thereof being broken away to disclose details of construction.
Figure 3:
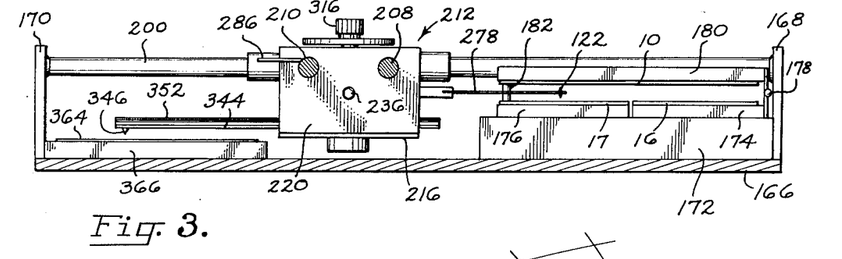
FIGURE 3 is a sectional view of the computer taken along the line 3—3 in FIGURE 2.

Referring now particularly to FIGURES 2 and 3 of the drawings, the computer of the present invention is supported upon a table 166 which, in turn, is suitably supported at a convenient elevation above a floor. The table is provided with rear end posts 168 and front end posts 170.

Mounted firmly upon the table a spaced distance above the latter, by means such as the base block 172, is the phase sheet assembly P. As mentioned hereinbefore, the phase sheet assembly consists of two sections 56 and 58 of resistive material in sheet form. Each of these is secured to a rigid backing member 174, 176, respectively. These backing members are constructed of electrically insulating material and are mounted in spaced relation by means of the base block 172. The resistive material is secured to the upper surface of the backing members by such means as an adhesive.

To the rearward edge of the supporting base block of the phase sheet assembly is pivotally secured, by means of hinge 178, the rearward edge of the magnitude sheet assembly M. The resistive sheet material of the magnitude sheet is secured to a backing member 180 of electrically insulating material, the resistance material being disposed on the side of the backing member facing the phase sheet.

The hinge permits the magnitude sheet to be swung upward rearwardly, to expose the phase sheet. In addition, the hinge functions to space the magnitude sheet a predetermined distance above the phase sheet when superimposed thereover, for purposes explained more fully hereinafter. The forward end of the magnitude sheet is supported in said predetermined spaced relation above the phase sheet by such means as the pedestals 182.

Figure 16:
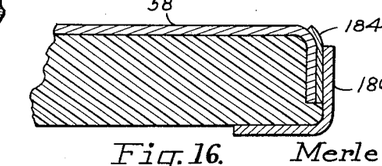
FIGURE 16 is a fragmentary sectional view taken along the line 16—16 in FIGURE 2, and showing the construction of the conducting boundary at the peripheral edge of the phase sheet.

As best shown in FIGURE 16 of the drawings, the outer longitudinal edges of the resistive elements of the phase sheet assembly are folded downward over the outer edges of the respective backing members 174, 176. A layer of highly conductive material 184, such as conductive paint, is then applied to the downturned edges to define the operative area of the resistance sheets and to provide a positive connection for the electrically conductive strip 186. The edge 62' of the conductive paint defines the conducting boundary of the sheet, as referred to hereinbefore.

Each of the longitudinal ends of the magnitude sheet 44 is provided with a similar conducting film and a conducting strip in manner similar to the above described edge construction of the phase sheet, to provide the conducting boundaries 46 and 48.

Figure 15:
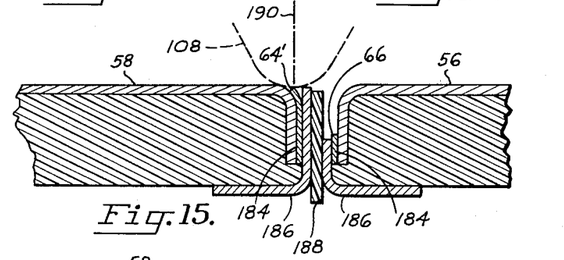
FIGURE 15 is a fragmentary sectional view taken along the line 15—15 in FIGURE 14.

The construction of the central longitudinal insulating boundary of the phase sheet assembly is best shown in FIGURE 15. The inner longitudinal edges of the resistive sheets are turned downward along the inner spaced edges of the backing members 174, 176. A conducting film 184 is then applied thereto, and the conducting strips 186 secured in contact therewith. A strip of electrically insulating material 188 separates the conducting strips.

Figure 14:
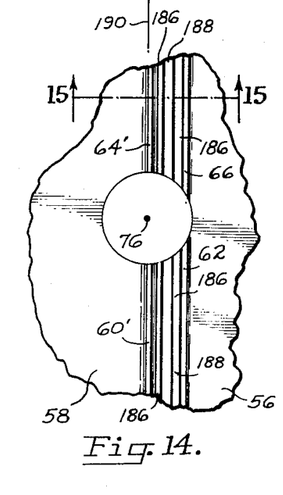
FIGURE 14 is a fragmentary plan view showing details of construction of the phase sheet assembly along the central insulating boundary thereof.

It is to be noted that the dot and dash line 190 in FIGURES 2, 14 and 15 represents the center line of the composite phase sheet assembly. Accordingly, the conducting film 184 applied to the edge of resistive sheet 58 terminates at its upper edge 64' in such a manner that if the curved edge of the resistive sheet were unfolded to the plane of the latter, the upper edge of the conductive film would lie on the center line 190. Similarly, the conductive film is applied to the other resistive sheet 56 in such manner that if the downwardly projecting portion of the resistive sheet were unfolded to the plane of the latter, the upper edge 66 of the conductive film would lie on the center line 190.

The upper edges 60', 64' and 62, 66 are the central conducting boundaries discussed hereinbefore. By this construction the voltage distribution on the plane surfaces of the sheets 56 and 58 is the same as though these edges were superimposed along the equipotential line passing through the center 76 of the semicircular insulating boundaries 70, 72.

The upper edge of the insulating strip 188 terminates adjacent the plane of the upper surface of the resistive sheets to form an electrical barrier across which a movable contact 108, illustrated in FIGURE 15 in dashed line and described in detail hereinafter, must pass when moving from one resistive sheet to the other.

The central insulating boundaries 70, 72 of the phase sheet (FIGURE 2) are shown in detail in FIGURE 14. The center of the boundaries lies on the center line 190 of the phase sheet assembly. Accordingly, the boundaries are formed conveniently by drilling a hole through the backing assembly and insulating barrier and thereafter plugging the hole with an electrical insulator. It is to be understood that the resistive sheets are cut in such manner that were the folded edges to be unfolded, they would form the semicircles 70, 72 having the common center 76 lying on the center line 190 of the phase sheet assembly. The top end of the plug preferably lies in the plane of the upper surface of the resistive sheets, in order to provide smooth passage thereover for the movable contact elements referred to hereinbefore.

Since the points $z$ are fixed on the sheets, and the contacts representing $a_1$, $a_2$, etc. and $s$ are to remain fixed in the coordinate system as the value of $z$ is varied, it is necessary to provide for relative movement between the sheets and the coordinate system. In the embodiment illustrated, the sheets are fixed in position on the table and means is provided for moving the coordinate system in relation thereto in the directions of the coordinates.

Referring to FIGURES 2 and 3 of the drawings, there is shown the rods 200 and 202 supported between the rear posts 168 and front posts 170 a spaced distance above the table and adjacent the side edges of the latter. Sleeves 204 and 206 are mounted slidably on these respective rods for movement longitudinally thereover. A pair of transverse rods 208, 210 are secured at their opposite ends to the sleeves and extend therebetween in spaced parallel relation. These transverse rods function to support slidably thereon a rectangular housing 212 which comprises top and bottom plates 214, 216, respectively, and end plates 218, 220. The transverse rods extend slidably through openings in the end plates, whereby to permit movement of the housing along the longitudinal axes of the rods.

Movement of the sleeves along the rods 200, 202, as well as movement of the housing along the transverse rods 208, 210, may be effected by hand or by any conventional mechanical means, such as rack and pinion assemblies (not shown), or other means well-known to those skilled in the art. In addition, conventional locking means may be employed to secure the parts in adjusted position, if desired.

Figures 4, 5, 6:
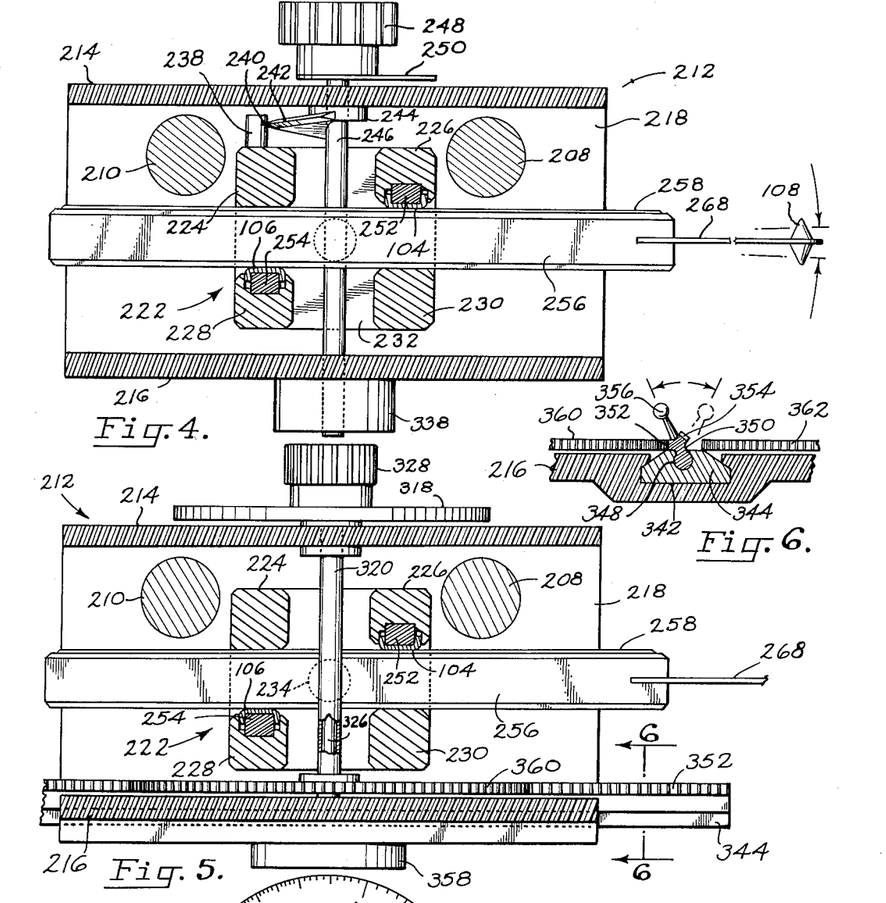
FIGURE 4 is a sectional view taken along the line 4—4 in FIGURE 2.
FIGURE 5 is a sectional view taken along the line 5—5 in FIGURE 2.
FIGURE 6 is a fragmentary sectional view taken along the line 6—6 in FIGURE 5.

Referring now particularly to FIGURES 4 and 5 of the drawings, there is mounted within the housing 212 a bus bar assembly 222 which comprises four elongated rods 224, 226, 228, 230 of electrically insulating material, which are secured at their opposite ends at the four corners of spaced end plates 232. These end plates are mounted rotatably on bolts 234, 236 which are supported by the end plates of the housing, whereby to permit rotation of the bus bar assembly about the common axis of the pivot bolts.

Rotation of the bus bar assembly through a limited arc may be afforded by various means, one of which is illustrated in FIGURE 4. A post 238 is secured to rod 224 and is provided adjacent its upper end with a notch 240 adapted to receive slidably therein a spiral cam 242 which is secured to a collar 244 mounted upon the shaft 246. This shaft extends through the upper and lower plates 214, 216 of the housing and is fitted at its upper end with a control knob 248 which carries a pointer 250 for indicating the position of rotation of the bus bar assembly. This control is shown in FIGURE 2 at the left hand end of housing 212. It will be understood that as the control knob is rotated, the spiral cam is caused to move in the slot provided in post 238, whereby to move the post vertically and cause rotation of the bus bar assembly about the axis of pivot bolts.

One of the upper rods, e.g. 226, carries bus bar 104 which extends substantially the full length of the rod and projects from the lower surface thereof. It is preferred that the bus bar be mounted resiliently, and to this end it is backed by a resilient backing strip 252 of rubber or other resilient material.

Similarly, one of the lower rods, e.g. 228, supports bus bar 106, backed by a resilient strip 254. This bus bar projects from the upper face of the rod.

The bus bar assembly functions to support removably and slidably between the upper and lower pairs of rods a plurality of adjustable contact assemblies, the construction of which is best illustrated in FIGURES 9 to 13. Each contact assembly comprises an elongated base section 256 of electrically non-conducting material, such as synthetic plastic. The base section is preferably square or rectangular in cross section and is provided along one surface with an electrically conducting contact bar 258. The forward end of the base section is provided with a recess 260 adapted to receive a conductance element 110 which is secured frictionally therein by engagement of the rearward enlarged head 262 of the conductance element with a friction clip 264 connected electrically to the contact bar 258.

Figure 9:
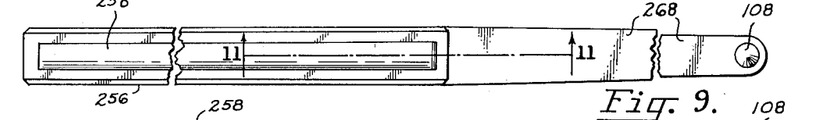
FIGURE 9 is a foreshortened plan view of a contact assembly forming a part of the present invention.
Figure 10:
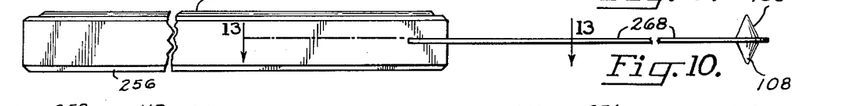
FIGURE 10 is a foreshortened side view of the contact assembly shown in FIGURE 9.
Figure 11:
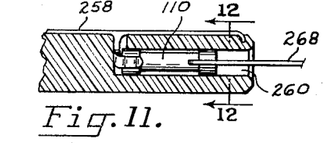
FIGURE 11 is a fragmentary sectional view taken along the line 11—11 in FIGURE 9.
Figure 12:
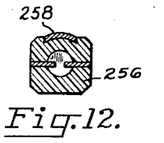
FIGURE 12 is a sectional view taken along the line 12—12 in FIGURE 11.

The magnitude of the exponent $m$ of a factor in the equations set forth hereinbefore is provided by the conductance element 110 in the movable contact assembly. A standard conductance is employed for an exponent having a magnitude of one, and other exponents may be provided by substituting conductance elements having proportionately smaller or larger conductance values.

The contact bar 258 may be placed in contact with either of the bus bars 104 or 106, by rotating the base section 256 through 180°, to select the proper sign of the exponent.

Figure 13:
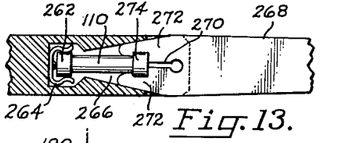
FIGURE 13 is a fragmentary sectional view taken along the line 13—13 in FIGURE 10.

The forwardmost end of the recess 260 is formed in the shape of a flared slot 266 proportioned to receive slidably therein the rearward end of the electrically conducting arm 268. As best shown in FIGURE 13, the rearward end of this arm is tapered inwardly, corresponding with the taper of slot 266, and is provided with a forwardly extending central slot 270. Thus, the rearward end is bifurcated, forming spaced fingers 272, which are adapted resiliently to clip over the enlarged forward head 274 of the conductance element, to secure the latter firmly to the contact arm 268. This unit may then be pushed rearwardly through the recess and tapered slot in the forward end of the base section, whereby to secure the contact arm firmly thereto.

The forward end of the contact arm 268 is provided with electrical contact points 108 projecting from the top and bottom surfaces. As best shown in FIGURE 3 of the drawings, the contact arms project through the space between the magnitude and phase sheet assemblies. Thus, by selective manipulation of control knob 248, the bus bar assembly may be rotated about the axis of its pivot bolts to bring the contact points 108 of each contact arm into engagement with the magnitude sheet or the phase sheet, as desired. The contact arms are sufficiently flexible to insure positive engagement of each contact point with the selected sheet at the points $a$ of the various factors in the function.

In FIGURE 2 of the drawings, there is also shown a pair of permanent contact arms 276, 278 supported by and extending from the bus bar assembly adjacent the opposite ends of the latter. These arms also extend forwardly between the magnitude and phase sheets and are provided with contact points 120 and 122, respectively, for selectively engaging the magnitude and phase sheets, at the alternative points s referred to hereinbefore. The permanent contact arms do not make electrical contact with the bus bars. Instead, a flexible electrical conductor extends from each contact arm directly to the alternative connections of switch 124.

As stated hereinbefore, the preferred coordinates for the computer of the present invention are the logarithm of the magnitude and the phase of $w$, which are the components of the logarithm of $w$. Since the coordinate system is fixed in relation to housing 212, and point $z$ on either sheet is fixed in relation to the table, the relative position of the housing and the sheet is calibrated in terms of the components of the logarithm of $z$. Accordingly, movement of the housing longitudinally along the transverse rods 208, 210 is indicated on a logarithmic scale, which is provided conveniently (FIGURE 2) on rod 210. A plate 280, carried by the housing, is provided with an index pointer 282 which identifies the magnitude of $z$, indicated by the designation $|z|$. A second index pointer 284 on the plate identifies the magnitude of $z$ divided by 2 Pi, as indicated by the designation $$\frac{|z|}{2\pi}$$

Similar logarithmic graduations, increasing in the reverse direction, are provided on rod 210 to the right of the housing, and a plate 286 is secured to the right hand end plate of the housing to carry an index pointer 288 for indicating the magnitude of the reciprocal of $z$, indicated by the designation $$\frac{1}{|z|}$$

The travel of housing 212 on the transverse rods is limited by stops 290 and 292. The housing is permitted to travel a distance of four logarithmic decades, between the values of 0.01 and 100, for the index pointer for the magnitude of $z$.

The movement of the housing and the supporting transverse rods in the longitudinal direction of the supporting rods 200 and 202, i.e. in the phase coordinate, is conveniently indicated by means of linear calibrations applied, for example, on the rod 200. An index pointer 294 is formed in a central opening 296 in sleeve 204, through which the phase calibrations are visible. The index pointer registers with the calibrations to indicate the phase of $z$, identified by the designation $\angle z$. The calibrations are indicated in degrees from $-180°$ to $+180°$, and stops 298 and 300 limit the travel of the sleeves so that the index pointer is restricted to travel between these limits of calibration.

It has already been stated that for functions in the form $(z-a)$, the magnitude of $s$ must always be much greater than the magnitude of $z$. It is assumed that this condition is satisfied when the magnitude of $s$ is 100 times greater than the largest magnitude of $z$. Since the magnitude of $z$ is limited to a maximum value of 100, the magnitude of $s$ for this form of the function is established at a minimum value of 10,000. Additionally, for use with the phase sheet and the circuitry illustrated, the value of $s$ must be negative, i.e. the phase of $s$ must be 180°. Accordingly, contact point 120, which represents point $s$ for this form of the function, is permanently located in the coordinate system at a magnitude of 10,000 and a phase of 180°.

Similarly, for functions in the form $$\left(1-\frac{z}{a}\right)$$

the magnitude of $s$ must always be much less than the magnitude of $z$, and also at an angle of 180°. Assuming that this condition is satisfied when the value of $s$ is 0.01 times the smallest value of $z$, which is limited to a minimum value of 0.01, contact point 122, which represents point $s$ for this form of the function, is located in the coordinate system at a magnitude of 0.0001 and a phase of 180°.

Accordingly, the permanent positions of contacts 120 and 122 may be located by setting the housing 212 at the position at which the magnitude of $z$ is 1, and the phase of $z$ is zero, and placing the contacts 120 and 122 four decades to the left and to the right, respectively, of the midpoint between the boundaries 72 and 74, and on a line extending midway between the centers of the insulating boundaries 72 and 74, as shown in FIGURE 2.

Since these permanent contacts travel in the phase direction between the conducting boundaries of the phase sheet section 58, the conducting boundaries 64' and 60' are purposely placed at the fold, as shown to the left of the insulating barrier 188 in FIGURES 14 and 15, in order to permit the contact to remain in engagement with the sheet over the full 360° range of phase. It is to be understood that the length of the magnitude and phase sheets is sufficient to include the full range of travel of contacts 120 and 122 in the magnitude direction.

For explanatory purposes, there is shown (FIGURE 2) extending between the permanent contacts 120 and 122, and projecting therefrom, an outer rectangular area defined by dot-and-dash lines. It is to be understood that this area is fixed in the coordinate system, and therefore moves with housing 212. This rectangular area always remains within the area of the sheet over the full range of travel of the housing in the magnitude and phase directions. Accordingly, movable contacts 108 representing the various values of $a$ in the function may be placed anywhere within this rectangular area. Thus, the computer illustrated accommodates values of $a$ ranging in magnitude from 0.0001 to 10,000, with any value of phase.

Contacts representing values of $a$ within 0.01 and 100 will be positioned within the central area of the rectangle, defined by the dotted lines 302 and 304. To locate a contact representing a value of $a$ within this range, the housing is moved to a position at which the index pointers 282 and 294 indicate the values of magnitude and phase, respectively, of $z$ which are equal to the values of magnitude and phase of $a$. The base section 256 of a movable contact assembly is then inserted in the bus bar assembly with the contact bar 258 engaging the appropriate bus bar. The contact assembly is then manipulated to place the contact point 108 precisely over the center point 76. It is to be understood that the value of the conductance 110 used in the contact assembly has been properly chosen to represent the magnitude of the exponent $m$ associated with the factor containing the value of $a$ being located.

The foregoing procedure is repeated as necessary to locate the value of $a$ for each factor in the function.

Contacts representing values of $a$ between 0.0001 and 0.01 and between 100 and 10,000 will be positioned within the areas of the dot-and-dash rectangle to the left and right of the inner rectangle. For such contacts, the value of $z$ cannot be set equal to the value of $a$. Accordingly, to locate the position of a contact representing such a value of $a$, the housing is moved to the position at which the index pointers 282 and 294 indicate the values of magnitude and phase, respectively, of $z$, which are equal exactly either to 100 times $a$ or to 0.01 times $a$. It follows, therefore, that at these points $a$ is equal exactly to 0.01 $z$, or 100 $z$, respectively. These points are located exactly two decades to the left and to the right, respectively, of point $z$, and are identified by the visible points 306 and 308 provided on the phase sheet assembly, and the contact point 108 of a contact assembly is placed over the appropriate one of these points, depending upon the value of $a$ being located.

Figure 7:
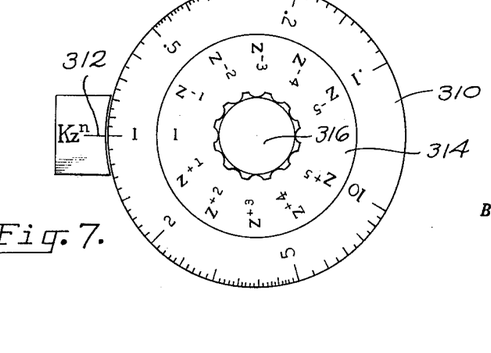
FIGURE 7 is a plan view showing an arrangement of concentric reading dials for the factor $K$ and the exponent $n$ on $z$, in the aforementioned equations.

In FIGURE 7 of the drawings, there is shown a pair of concentric dials, indicated in FIGURE 2 at the right hand end of housing 212. These dials provide for the indications of the magnitude of K, and the power $n$ of $z$. The outer dial 310 of this pair is connected through the outer control shaft of a pair of concentric shafts to potentiometer resistance 150 and is manipulated by hand from the knurled circumference. Potentiometer resistance 150 provides for the introduction of the magnitude of K, as previously explained. Accordingly, this outer dial is provided with a scale which is graduated logarithmically and is associated with the index pointer 312 for indicating values of the magnitude of K. In the embodiment illustrated, this scale is marked for values ranging from 0.1 to 10.

The inner dial 314, preferably received within a central recess in outer dial 310, is connected through the inner control shaft of the said pair to switch 102, and is manipulated by knob 316. Since switch 102 provides for the introduction of the exponent $n$ on $z$, the inner dial is provided with markings indicating powers of $z$, ranging from $z^{-5}$ to $z^{+5}$. These markings also are associated with with the index pointer 312. Accordingly, this index pointer is provided with the designation $Kz^n$.

Figure 8:
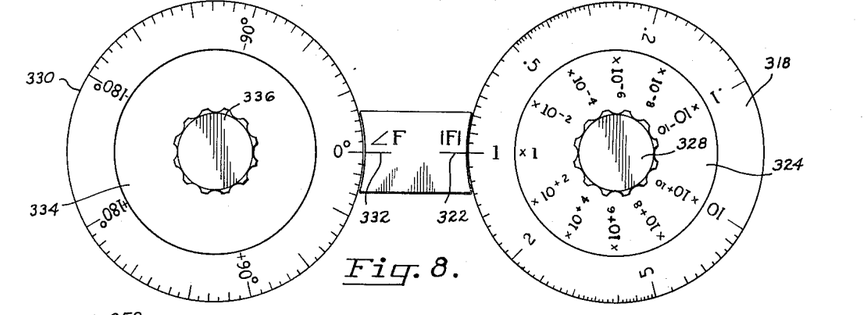
FIGURE 8 is a plan view showing an arrangement of concentric reading dials for the phase and magnitude values of the function $F$.

In FIGURE 8 of the drawings there is illustrated similar forms of dials for indicating selected values of the magnitude and phase of F. The magnitude dial assembly includes an outer dial 318 which is connected through the outer control shaft 320 to potentiometer resistance 146, and is manipulated from the knurled circumference to provide for the introduction of the magnitude of F. This dial is provided with a logarithmic scale marked for values ranging from 0.1 to 10, and is associated with index pointer 322 for indicating values of the magnitude of F, as indicated by the designation $|F|$.

The inner dial 324 preferably is received within a central recess in the outer dial 318 and is connected through inner control shaft 326 to switch 138. The inner dial is manipulated by knob 328. Since switch 138 provides for the introduction of the magnitude of F in fixed units representing positive or negative powers of 100, the inner dial is provided with markings ranging from $10^{-10}$ to $10^{+10}$. These markings are associated with the index pointer 322.

It will be understood that switch 138 provides for the introduction of the magnitude of F in fixed logarithmic increments and that potentiometer 146 provides for the interpolation of intermediate values. Since the currents from the switch and potentiometer represent logarithmic components of the magnitude values indicated on dials 318 and 324, and are added in the current combining circuit, their sum represents the logarithm of the product of the readings on the dials.

In similar manner, the phase dial assembly includes an outer dial 330 which is connected through the outer control shaft of a pair of concentric shafts to potentiometer resistance 160. Since this potentiometer provides for the introduction of the phase of F, the dial is provided with a scale calibrated in degrees and covering the range from $-180°$ to $+180°$. This scale is associated with index pointer 332 carrying the designation $\angle F$. The inner dial 334 is connected through the inner control shaft of the said pair to switch 156 and is manipulated by knob 336.

The current from potentiometer 160 is proportional to the phase value indicated on dial 330, and the current from switch 156 is proportional to a phase value which is an exact multiple of 360°. Since these currents are added in the current combining circuit, their sum represents a phase value which is the sum of the phase value indicated on dial 330 and an exact multiple of 360°. Since the phase of any complex quantity may be specified by any one of an infinite number of phase values differing by an exact multiple of 360°, the phase of F may be specified by the readings on the outer dial 330 alone, and the inner dial 334 need not be calibrated.

There has now been provided means for introducing arbitrary values for all of the quantities on both sides of either of the equations originally set forth.

For comparison of the magnitudes of the right and left hand sides of the equation, control knob 248 is rotated to bring pointer 250 to the position identified by the letter M in FIGURE 2. By varying the value of one or more of the parameters, a condition of equality in magnitude between the right and left hand sides of the equation may be obtained, and the condition will be indicated by the null indicator 118.

For comparsion of the phases of the right and left hand sides of the equation, control knob 248 is rotated to bring the pointer to the position identified by the letter P in FIGURE 2. By varying the values of one or more of the parameters, a condition of equality in phase between the right and left hand sides of the equation may be obtained, as indicated by the null indicator.

It is to be noted that control knob 248 performs the dual function of rotating the bus bar assembly to bring the various permanent and movable contacts into engagement with either the magnitude sheet or the phase sheet, and also of controlling the position of switches 130, 140, 142. These switches are ganged together mechanically, as indicated by the dotted line in FIGURE 17. These switches are indicated in FIGURE 4 as being contained in the box 338. An additional switch (not shown), may also be controlled by knob 248 to disconnect the power supply from primary winding 78 when control knob pointer 250 is in the Off position indicated in FIGURE 2.

The foregoing procedure may be applied to equations containing factors in either of the forms $(z-a)$ or $$\left(1-\frac{z}{a}\right)$$

The desired form is selected by control knob 340 shown in the lower left hand corner of FIGURE 2, which functions to control the switches 84, 94, 90, 92, 96, 132 and 124. These switches are ganged together mechanically as indicated by the dotted line in FIGURE 17.

It is frequently desired either to plot values of $z$ established on the computer or, conversely, to establish on the computer values of $z$ previously plotted. It is also frequently desired to plot values of the magnitude or phase of F versus the magnitude of $z$. These operations are facilitated by direct mechanical transfer between coordinates in the plot and coordinate settings in the computer. One means for accomplishing this is illustrated in the drawings.

Referring particularly to FIGURES 5 and 6, the bottom plate 216 of the housing 212 is shown to be thickened in the central area between the magnitude and phase dials (FIGURE 2), and provided with a groove 342 adapted slidably to receive therein a bar 344 which carries a stylus 346 adjacent one end. The stylus may be a mechanical marking device, or it may simply comprise a hole through the bar 344 for guiding a pencil point or other marking implement.

A central longitudinal groove 348 is formed in the bar to receive pivotally therein a rack member 350 provided with a pair of substantially oppositely directed rack elements 352 and 354. The rack member is constrained against longitudinal movement relative to the bar 344, but is permitted a limited axial rotation. This xaial rotation is afforded by means of control lever 356 conveniently positioned adjacent the stylus, as shown in FIGURE 2.

In FIGURE 5 of the drawings, the magnitude switch 138 and potentiometer 146, shown schematically in FIGURE 17, are contained within a box 358 supported from the underside of the bottom plate 216. As previously explained, a pair of concentric shafts are employed to rotate the switch and potentiometer, the inner shaft 326 functioning to control the switch and the outer shaft 320 functioning to control the potentiometer. A pinion gear 360 is secured for rotation with this outer shaft 320. In similar manner, concentric shafts are provided for operating the phase switch 156 and phase potentiometer 160, and a similar pinion gear 362 (FIGURE 6) is secured to the outer shaft for rotation therewith. Thus, it will be seen from FIGURE 6 that control lever 356 may be manipulated to bring one set of rack teeth 352 into engagement with the pinion gear 360 on the magnitude potentiometer shaft, or the other set of rack teeth 354 into engagement with the pinion gear 362 on the phase potentiometer shaft.

In the neutral position between these engagements, the bar 344 is held frictionally in the groove of bottom plate 216 and thereby retained in fixed position relative to the housing 212. If desired, a mechanical lock may be provided to insure against accidental displacement of the bar relative to the housing.

In the neutral position of the rack member, with bar 344 secured in fixed position with relation to the housing, the stylus 346 traces out values of $z$ in a logarithmic coordinate system fixed in relation to the table. Accordingly, values of $z$ established by the position of the housing may be transferred by means of the stylus to a sheet of paper 364 which, as illustrated, is secured to a board 366 supported in fixed position upon the table. Alternatively, a graphic plot of values of $z$ may be secured to the board and values of $z$ transferred therefrom to the computer by moving the housing to the position at which the stylus is over the desired point in the plot. It is to be understood that the graphic plot must be in a logarithmic coordinate system having the same scale as that of the computer, and must be oriented on the table to correspond with the $z$ coordinates of the computer.

When the control lever 356 is moved to the position shown in FIGURE 6, with rack teeth 352 engaging the pinion gear 360 on the control shaft of the magnitude potentiometer 146, rotation of the magnitude dial 318 causes the stylus to move relative to the housing 212 in a line normal to the magnitude coordinate. Accordingly, by moving the housing along the transverse rods to various values of $|z|$, while the housing is maintained at a constant position relative to the phase $z$ coordinate, and setting dial 318 to corresponding values of $|F|$, the stylus traces out a plot of the magnitude of F versus the magnitude of $z$.

It is preferred that potentiometer 146 be linear, in order that the coordinate scale for the phase of F in the plot may be logarithmic. It will be evident that the coordinate scale for the magnitude of $z$ in the plot will be the same logarithmic scale as the calibration on rod 210.

Plots of the phase of F versus the magnitude of $z$ may be obtained in manner similar to the foregoing, by moving control lever 356 to the position at which rack teeth 354 engage the pinion gear 362 connected to the control shaft of the phase potentiometer 160.

In the foregoing procedure, the housing 212 was held fixed against movement in the phase $z$ direction. Although this form of plot is usually made in this manner, i.e. at a constant value of phase $z$, it may be desirable in some instances to plot the magnitude or phase of F versus the magnitude of $z$ while the phase of $z$ is allowed to vary. Such plots require that the magnitude F and phase F dials 318 and 330, respectively, be restricted to movement only in the magnitude $z$ direction. Therefore, it would be required that a separate support be provided for these dials and the associated stylus, and that this support be coupled mechanically to housing 212 supporting the bus bar assembly, in such manner that the separate support moves simultaneously with the housing in the magnitude $z$ direction only.

In describing the operation of the computer of the present invention, a simple but typical problem involved in the design of a servomechanism will be illustrated, and reference is made to the publication "Theory of Servomechanisms," by James, Nichols and Phillips (McGraw-Hill, 1947). In general, the problem involves the provision of an equalizing network which may be added to the system to improve its performance. The technique of selecting optimum values for the constants of this network involves selecting trial values and calculating any of various performance criteria of the system. From the results of these calculations different values for the constants are chosen and the calculations repeated, as many times as is required to arrive at the desired result. The computer of the present invention affords a simplified means for expediting these calculations.

One problem exemplified in the reference for use as a criterion of the performance is the determination of loop gain and phase shift versus frequency. In the reference problem arbitrary values have been assigned to the various parameters in equation 122b, page 198, to provide the curves $a$ and $b$ of FIG. 4.36, page 200.

In the nomenclature employed in the foregoing description of the computer, the above curves are plots of the magnitude and phase of F versus the magnitude of $z$ for a constant value of the phase of $z$ equal to 90°, in the following equation:

$$F = \frac{1}{z(1+z)} \cdot \frac{(1+0.100z)}{(1+0.0172z)}$$

or $$F = z^{-1}(1+z)^{-1}(1+0.100z)^{+1}(1+0.0172z)^{-1}$$

This latter equation corresponds to the second form of the equations originally set forth hereinbefore. Accordingly, the reference curves may be derived by use of the computer of the present invention, as follows:

Since the second form of the equation is employed, the pointer of control knob 340 is set for the form $$\left(1 - \frac{z}{a}\right)$$

as shown in FIGURE 2. The K dial 310 is then set at the value of 1, and the $z$ exponent dial 314 is set at $z^{-1}$.

In the factor $(1+z)^{-1}$, the parameter $a$ is equal to $-1$, i.e., the magnitude of $a$ is equal to 1, and the phase of $a$ is equal to 180°. Accordingly, the housing 212 is moved to the position at which $|z|=1$ and $\angle z=180°$. A movable contact assembly is then provided with a conductance element 110 representing the exponent magnitude value of 1, and the assembly installed in the bus bar assembly in electrical contact with bus bar 106, representing the negative sign of the exponent. The contact assembly is then manipulated to bring the contact point 108 (FIGURE 2) precisely over the center point 76 of the phase sheet assembly P.

In the factor $(1+0.100z)^{+1}$, the parameter $a$ is equal to $$-\frac{1}{0.100}$$

i.e. the magnitude of $a$ is equal to $$\frac{1}{0.100}$$

and the phase of $a$ is equal to 180°. Since the computer is provided with a scale indicating values of $$\frac{1}{|z|}$$

it is convenient to use the magnitude of $$\frac{1}{a}$$

equal to 0.100, and to set the housing at the magnitude of $$\frac{1}{z}$$

equal to 0.100 and phase of $z$ equal to 180°. A second contact assembly, provided with a conductance element 110 representing the exponent magnitude value of 1 is then installed in the bus bar assembly in electrical contact with the bus bar 104, representing the positive sign of the exponent, and manipulated to bring the contact point 108 precisely over the center point 76 of the phase sheet assembly.

In the factor $(1+0.0172z)^{-1}$, the magnitude of $$\frac{1}{a}$$

is equal to 0.0172 and the phase of $a$ is equal to 180°. Therefore, the housing is set at the magnitude of $$\frac{1}{z}$$

equal to 0.0172 and the phase of $z$ equal to 180°. The third contact assembly is then provided with the proper conductance element 110 and its contact point 108 positioned at the center point 76, as previously explained. The right hand side of the equation is now set up on the computer.

It is to be understood that prior to the foregoing procedure the magnitude sheet was swung upward to expose the phase sheet assembly and to permit manipulation of the contact assemblies. The magnitude sheet is now lowered in the position above the phase sheet.

For the evaluation of the magnitude of function F for any desired value of $z$, the pointer of control knob 248 is moved to the position M to bring the contact points into engagement with the magnitude sheet. Since the phase of $z$ is to be held constant at 90°, the housing and supporting transverse rods are moved to the position for this value of phase. Various values of the magnitude of the function F may now be obtained by adjusting the housing 212 to selected values of the magnitude of $z$ and manipulating the magnitude dials 318 and 324 until a null is indicated on the null indicator 118. The values of magnitude of F and magnitude of $z$ may be read from their respective scales and manually tabulated or plotted, or they may be plotted directly by means of the stylus and the rack and pinion assemblies described hereinbefore.

For the evaluation of the phase of F, the pointer of control knob 248 is moved to the position P (FIGURE 2) to bring the contact points into engagement with the phase sheet, and the foregoing procedure is repeated.

It is to be noted that actual values of magnitude are indicated on dial 318 in FIGURE 8, whereas decibel units of magnitude are employed in the reference FIG. 4.36. Since these units are directly interchangeable, it will be apparent that a second scale, graduated in decibels, may be provided on dial 318, if desired.

It is to be noted further that index pointer 284 is provided for indicating values of the magnitude of $$\frac{z}{2\pi}$$

This is provided as a convenience in obtaining readings of actual frequency in those problems in which the magnitude of $z$ represents angular frequency.

Another important application of the computer in the analyses of servomechanisms is the construction of root locus plots. In the servomechanism of the foregoing example, the root locus plot is a plot of the loci of the roots of the equation $$K\frac{(1+0.100z)}{z(1+z)(1+0.0172z)} = -1$$

as the value of the magnitude of K is varied. In this equation K is understood to be a positive real quantity, i.e. its phase is zero degrees. The phase of the quantity −1 is 180°, and therefore the loci are plots of the values of $z$ for which the phase of the left hand side of the equation is 180°. Accordingly, the computer is set up exactly as for the phase measurements in the foregoing example, and the phase F dial 330 is set at 180°.

For plotting these loci the stylus arm 344 is maintained in fixed position relative to the housing 212, i.e in the neutral position of control lever 356, previously described. The housing is then adjusted to move one of the contact points 108 in a path around the center point 76 of the phase sheet until a null is indicated. This value of $z$ is then marked by means of the stylus 346 on a paper 364 secured to plotting board 366. Additional points are located by moving the housing in such manner as to move the contact point away from the center point 76, to find other values of $z$ at which a null is indicated. These points trace a curve which is the locus of one of the roots of the equation. Curves for the other roots are similarly derived by repeating the foregoing procedure for each of the remaining contact points 108.

For the determination of K values along these curves, control knob 248 is moved to the magnitude position M to bring the contact points into engagement with the magnitude sheet, and the magnitude F dial 318 is set at the value 1. The housing is then moved to place the stylus at any desired point on one of these curves, and the K dial 310 is rotated until a null is indicated. This value of K may then be recorded on the sheet of paper at the stylus point on the curve.

In the event that a null is not obtained over the K dial range, the magnitude F switch dial 324 is moved to some other setting from its previously established setting of 1, until a null is obtained within the range of the K dial. The value of K thus indicated on the dial then must be divided by the new value of F to obtain the true value of K in the equation.

Other determinations relating to electrical and mechanical systems are simplified by use of the computer. Among these are Nyquist plots, overall frequency response curves, and transient response determinations by evaluation of residues. The computer is also useful in other mathematical evaluations, such as the factoring of polynomials.

It will be apparent to those skilled in the art that various changes and modifications of the details of construction described hereinbefore may be made without departing from the scope and spirit of the present invention. For example, the magnitude and phase sheet assemblies may be placed side by side, as illustrated in FIGURE 17, rather than in the superimposed relation shown in FIGURE 2, requiring only an additional phase scale calibration on rod 200. Additionally, by providing separate phase and magnitude scales for each sheet, the sheets may be placed in any unrelated position, or they may be embodied in separate instruments.

The magnitude and phase sheet assemblies may also be cylindrical in form, rather than the plane form illustrated. In this case, the magnitude coordinate is directed axially and a phase coordinate is directed circumferentially.

The permanent contacts 120, 122 supported for movement with housing 212 may be replaced by potentiometers ganged to the movement of the housing, to provide voltages proportional to the components of the logarithm of $z$. The stylus assembly illustrated may be replaced by separate units connected independently to the magnitude and phase potentiometer control shafts.

In the preliminary discussion the conductances 100, 110, 136, 144, 148, 154 and 158 were identified as admittances, and this term is employed in the appended claims since it will be apparent that the conductances may be replaced by other types of admittances, such as capacitances. Further, the apparatus may be constructed to accommodate both forms of factors $(z-a)$ and $$\left(1-\frac{z}{a}\right)$$

or a separate apparatus may be constructed for each form. These alternative constructions are intended to be included in the claims wherein the forms $(z-a)$ or $$\left(1-\frac{z}{a}\right)$$

are recited. As explained hereinbefore, it is to be understood that both forms of factors cannot be employed simultaneously in a given function.

In the special case wherein the exponents of all factors in a function are always plus or minus one, a direct connection may be made between the physical quantity at each point $w=a$ and the combining device. Thus, for example, the contact points 108 may be connected directly to separate inputs of a summing device, in accordance with the sign of $m$. If transformers are substituted for the conductance elements the sign of each exponent may be accounted for by proper polarity connections. In any event, for this special case of operation, such connections are to be considered as modifying or multiplying means recited in the appended claims.

The physical quantity applied to the input of the multiplying device may provide an output from the multiplying device of a physical quantity which may have the same or different characteristic and magnitude of the input quantity. For example, the voltage input to the conductances provides a current output to the combining transformer 114. When transformer windings are substituted for the conductances, the input and output quantities both may be voltages, of the same or different magnitudes. A voltage input to a multiplying device may function to operate a mechanical device providing a physical quantity output of force or distance, for example. As a further example, a physical quantity input of height may provide an output quantity from the multiplying device of current or voltage. Accordingly, it is to be understood that the physical quantities recited in the appended claims may be the same or different in characteristics and magnitude.

Other modifications, such as the structural arrangement of the bus bar assembly, the means for selectively engaging the contacts with the magnitude and phase sheets, and many other details, may be changed as desired. Accordingly, it is to be understood that the foregoing description is primarily illustrative of the invention, and is not to be considered as limiting the scope thereof.

Having now described my invention and the manner in which the same may be used, what I claim as new and desire to secure by Letters Patent is:

1. Apparatus for evaluating quantatively a selected component of an algebraic function which includes the complex parameter $z$ and a plurality of complex parameters $a$ and corresponding coefficients $m$, and which function is an algebraic sum including terms each of which is in the form of a product of a coefficient $m$ and a form function containing the complex parameter $z$ and a complex parameter $a$, all of which terms contain the same form function and each term includes the same parameter $z$ to the same power and a different parameter $a$ and a corresponding coefficient $m$ and wherein $a$ is a parameter other than an exponent on $z$, said apparatus comprising first means establishing measurable physical quantities continuously representing the values of a pair of components for the complex parameter $z$, a plurality of second means one for each term and each establishing separate measurable physical quantities continuously representing the values of the pair of components for a corresponding complex parameter $a$, third means operatively associated with the first and second means for establishing for each term a measurable physical quantity continuously representing the value of the said selected component of the said form function, a plurality of fourth means one for each term and each establishing a separate measurable physical quantity representing the value of a corresponding coefficient $m$ and each operatively associated with the corresponding second means to form a pair of second and fourth means for that term for establishing a measurable physical quantity representing the product of the coefficient $m$ and said selected component of said form function for that term, and combining means operatively associated simultaneously with said pairs of second and fourth means for establishing a measurable physical quantity representing the value of said selected component of the algebraic sum of said terms.

2. The apparatus of claim 1 wherein the component to be evaluated is the real component.

3. The apparatus of claim 1 wherein the component to be evaluated is the imaginary component.

4. The apparatus of claim 1 for evaluating both the real and imaginary components, and including a pair of third means one for each component and each operatively associated selectively with the first and second means.

5. The apparatus of claim 1 wherein the third means is arranged to accommodate the form function $\log(z-a)$.

6. The apparatus of claim 1 wherein the third means is arranged to accommodate the form function $$\log\left(1-\frac{z}{a}\right)$$

7. The apparatus of claim 1 including means associated with the third means for arranging the latter to accommodate selectively one of the form functions $\log(z-a)$ and $$\log\left(1-\frac{z}{a}\right)$$

8. Apparatus for evaluating quantitatively a selected component of an algebraic function which includes the complex parameter $z$ and a plurality of complex parameters $a$ and corresponding coefficients $m$, and which function is an algebraic sum including terms each of which is in the form of a product of a coefficient $m$ and a form function containing the complex parameter $z$ and a complex parameter $a$, all said terms being in the same form and each containing a different parameter $a$ and corresponding coefficient $m$, said apparatus comprising means providing a distribution of a measurable physical quantity in a coordinate system defined by the real and imaginary components of a function of a complex variable $w$, wherein the physical quantity at every point $w$ in the distribution is proportional to the said selected component of the function of $z$ and $w$ corresponding to the form function with $w$ representing $a$, multiplying means for each term engaging the distribution at the point $w=a$ for that term and adapted to multiply the associated physical quantity by a value proportional to the coefficient $m$ of that term, whereby to provide a second physical quantity for each term proportional to the product of the coefficient $m$ and the said selected component of the form function for that term, and combining means connected to the multiplying means for algebraically summing the latter physical quantities.

9. The apparatus of claim 8 wherein the component to be evaluated is the real component.

10. The apparatus of claim 8 wherein the component to be evaluated is the imaginary component.

11. The apparatus of claim 8 for evaluating both the real and imaginary components, and including a pair of distributions one for each component and each operatively associated selectively with the multiplying means.

12. The apparatus of claim 8 wherein the distribution is arranged to accommodate the form function $\log(z-a)$.

13. The apparatus of claim 8 wherein the distribution is arranged to accommodate the form function $$\log\left(1-\frac{z}{a}\right)$$

14. The apparatus of claim 8 including means associated with the distribution for arranging the latter to accommodate selectively one of the form functions $\log(z-a)$ and $$\log\left(1-\frac{z}{a}\right)$$

15. The apparatus of claim 8 wherein the function of $w$ defining the coordinate system is chosen such that the distribution remains fixed in size and shape for all values of the parameter $z$.

16. The apparatus of claim 8 wherein the coordinate system is defined by the real and imaginary components of the logarithm of $w$.

17. The apparatus of claim 8 wherein the coordinate system is defined by the real and imaginary components of $w$.

18. The apparatus of claim 8 wherein the coordinate system is defined by the real and imaginary components of $$\frac{1}{w}$$

19. The apparatus of claim 8 wherein the distribution of a measurable physical quantity is an electric potential distribution in which the potential at every point $w$ relative to a reference potential is proportional to the said component of the functions of $z$ and $w$ corresponding to the function of the complex parameters $z$ and $a$.

20. The apparatus of claim 19 wherein each multiplying means comprises electric quantity modifying means proportional to the corresponding coefficient $m$, and conductor means for engaging each electric quantity modifying means with the distribution.

21. The apparatus of claim 20 wherein the electric quantity modifying means comprises an electrical admittance.

22. The apparatus of claim 20 wherein the electric quantity modifying means comprises an electrical voltage ratio device.

23. Apparatus for evaluating quantitatively a selected component of an algebraic function which includes the complex parameter $z$ and a plurality of complex parameters $a$ and corresponding coefficients $m$, and which function is an algebraic sum including terms each of which is in the form of a product of a coefficient $m$ and a form function containing the complex parameter $z$ and a complex parameter $a$, all said terms being in the same form and each containing a different parameter $a$ and corresponding coefficient $m$, said apparatus comprising a pair of relatively movable members, the first of said members providing a coordinate system defined by the real and imaginary components of a function of a complex variable $w$, adjusting means interengaging said members for positioning a reference point on the second of said members at $w=z$ in the coordinate system on the first member for establishing values of $z$, a plurality of elements one for each term and each mounted adjustably on the first member for positioning at the point $w=a$ for that term for establishing values of $a$ for each term, a distribution of a measurable physical quantity mounted on the second of said members and arranged in relation to the coordinate system so that the physical quantity at every point $w$ in the distribution is proportional to the said selected component of the function of $z$ and $w$ corresponding to the form function with $w$ representing $a$, the said elements engaging the distribution for establishing for each term a measurable physical quantity continuously representing the value of the said selected component of the said form function, a plurality of multiplying means one for each term and each establishing a separate measurable physical quantity representing the value of a corresponding coefficient $m$ and each operatively associated with the corresponding element for that term for establishing a measurable physical quantity representing the product of a coefficient $m$ and said selected component of said form function for that term, and combining means operatively associated simultaneously with said pairs of elements and multiplying means for establishing a measurable physical quantity representing the value of said selected component of the algebraic sum of said terms.

24. The apparatus of claim 23 wherein the component to be evaluated is the real component.

25. The apparatus of claim 23 wherein the component to be evaluated is the imaginary component.

26. The apparatus of claim 23 for evaluating both the real and imaginary components, and including a pair of distributions one for each component and each operatively associated selectively with the said elements.

27. The apparatus of claim 23 wherein the distribution is arranged to accommodate the form function $\log (z-a)$.

28. The apparatus of claim 23 wherein the distribution is arranged to accommodate the form function $$\log \left(1-\frac{z}{a}\right)$$

29. The apparatus of claim 23 including means associated with the distribution for arranging the latter to accommodate selectively one of the form functions $\log (z-a)$ and $$\log \left(1-\frac{z}{a}\right)$$

30. The apparatus of claim 23 wherein the function of $w$ defining the coordinate system is chosen such that the distribution remains fixed in size and shape for all values of the parameter $z$.

31. The apparatus of claim 23 wherein the coordinate system is defined by the real and imaginary components of the logarithm of $w$.

32. The apparatus of claim 23 wherein the coordinate system is defined by the real and imaginary components of $w$.

33. The apparatus of claim 23 wherein the coordinate system is defined by the real and imaginary components of $$\frac{1}{w}$$

34. The apparatus of claim 23 wherein the distribution of a measurable physical quantity is an electric potential distribution in which the potential at every point $w$ relative to a reference potential is proportional to the said component of the function of $z$ and $w$ corresponding to the function of the complex parameters $z$ and $a$.

35. The apparatus of claim 34 wherein each multiplying means comprises electric quantity modifying means proportional to the corresponding coefficient $m$, and conductor means connecting each electric quantity modifying means to the corresponding element.

36. The apparatus of claim 35 wherein the electric quantity modifying means comprises an electrical admittance.

37. The apparatus of claim 35 wherein the electric quantity modifying means comprises an electrical voltage ratio device.

38. The apparatus of claim 23 including scale means associated with the pair of relatively movable members and calibrated in terms of values of $z$.

39. The apparatus of claim 23 including stylus means carried by one of the relatively movable members and operable to trace and plot values of $z$.

40. The apparatus of claim 23 including movable stylus means operable by the combining means to trace and plot the said component of the algebraic function versus one of the said pair of components for the complex parameter $z$.

References Cited in the file of this patent
UNITED STATES PATENTS

| | | |
|---|---|---|
| 2,798,666 | Brown | July 9, 1957 |
| 2,858,978 | Yetter | Nov. 4, 1958 |

(Other references on following page)

OTHER REFERENCES

Proceedings of the I.R.E. (Bubb), December 1951, pages 1556–1561.

RCA Review (Schooley), July 1938, pages 86–96.

"A Function Generator for the Solution of Engineering Design Problems" (Savant and Howard), I.R.E. Transactions—Electronic Computers, September 1954, vol. EC–3, No. 3, pp. 34–38.

"Network Synthesis by the Use of Potential Analogs" (Scott), Proceedings of the I.R.E., August 1952, vol. 40, pp. 970–973.

"The Electronic Complex Plane Scanner" (Ragazzini and Reynolds), The Review of Scientific Instruments, vol. 24, No. 7, July 1953, pages 523–527.

"An Analogue Computer for Use in the Design of Servo Systems" (Ward), The Proceeding of the Institution of Electrical Engineers, December 1952, vol. 99, part 2 (Power Engineering), No. 72, pp. 521–532.